(12) United States Patent
Mangalam et al.

(10) Patent No.: US 11,729,057 B1
(45) Date of Patent: Aug. 15, 2023

(54) APPLICATION ARCHITECTURE DRIFT DETECTION SYSTEM

(71) Applicant: The Bank of New York Mellon, New York, NY (US)

(72) Inventors: Badri Mangalam, New York, NY (US); Sridhar Seetharaman, New York, NY (US); Lakshmi Thiruvengadathan, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 17/666,267

(22) Filed: Feb. 7, 2022

(51) Int. Cl.
| | |
|---|---|
| H04L 41/08 | (2022.01) |
| H04L 67/00 | (2022.01) |
| H04L 47/70 | (2022.01) |
| H04L 47/762 | (2022.01) |
| H04L 67/104 | (2022.01) |

(52) U.S. Cl.
CPC ........ *H04L 41/0883* (2013.01); *H04L 47/762* (2013.01); *H04L 47/822* (2013.01); *H04L 67/1044* (2013.01); *H04L 67/34* (2013.01)

(58) Field of Classification Search
CPC . H04L 41/0883; H04L 47/762; H04L 47/822; H04L 67/1044; H04L 67/34
See application file for complete search history.

(56) References Cited

U.S. PATENT DOCUMENTS

| | | |
|---|---|---|
| 5,835,911 A | 11/1998 | Nakagawa et al. |
| 6,279,001 B1 | 8/2001 | Debettencourt et al. |
| 6,385,770 B1 | 5/2002 | Sinander |

(Continued)

FOREIGN PATENT DOCUMENTS

| | | |
|---|---|---|
| WO | 01/33349 A3 | 5/2001 |

OTHER PUBLICATIONS

Erik Whiting et al. "Drift and Erosion in Software Architecture: Summary and Prevention Strategies", Feb. 2020 DOI:10.1145/3404663.3404665 ICISDM 2020: Proceedings of the 2020 the 4th International Conference on Information System and Data Mining, May 2020, (9 pgs.). https://doi.org/10.1145/3404663.3404665.

(Continued)

*Primary Examiner* — Blake J Rubin
(74) *Attorney, Agent, or Firm* — Pillsbury Winthrop Shaw Pittman, LLP

(57) ABSTRACT

Provided is an architecture drift detection system and method including: obtaining a first set of architecture design metrics associated with a first application; obtaining first set of data metrics associated with a first instance of the first application that is installed at a first server computing system; obtaining a second set of data metrics associated with a second instance of the first application that is installed at a second server computing system; determining, using the first set of data metrics and the second set of data metrics, that at least one of the first instance, the first server computing system, the second instance, or the second server computing system deviates from one or more architecture design metrics from the first set of architecture design metrics associated with the first application; and providing a deviation notification indicating a deviation from the one or more architecture design metrics.

20 Claims, 8 Drawing Sheets

(56) References Cited

U.S. PATENT DOCUMENTS

| | | | |
|---|---|---|---|
| 8,302,088 B2 | 10/2012 | Matthiesen | |
| 8,473,909 B2 | 7/2013 | Ramachandran | |
| 8,712,973 B2 | 4/2014 | Ramachandran | |
| 8,782,201 B2 | 7/2014 | Kephart et al. | |
| 8,990,369 B2* | 3/2015 | Hiltunen | H04L 67/51 709/223 |
| 9,009,521 B2 | 4/2015 | Jaisinghani | |
| 9,043,218 B2 | 5/2015 | Gilbert et al. | |
| 9,053,460 B2 | 6/2015 | Gilbert et al. | |
| 9,342,388 B1* | 5/2016 | Jin | H04L 67/563 |
| 9,471,294 B2* | 10/2016 | Giammaria | G06F 16/9535 |
| 9,497,136 B1* | 11/2016 | Ramarao | H04L 41/5009 |
| 9,871,706 B2* | 1/2018 | Hockett | H04L 67/1023 |
| 9,965,632 B2 | 5/2018 | Zarakas et al. | |
| 9,983,898 B2* | 5/2018 | Anderson | G06F 9/45533 |
| 10,466,990 B1 | 11/2019 | Mccluskey et al. | |
| 10,496,061 B2 | 12/2019 | Strohmenger et al. | |
| 10,642,826 B1* | 5/2020 | Holenstein | G06F 16/2365 |
| 10,713,888 B2 | 7/2020 | Ruiz et al. | |
| 10,938,674 B1* | 3/2021 | Natanzon | H04L 41/5096 |
| 11,036,556 B1* | 6/2021 | Sandstrom | G06F 9/4881 |
| 11,601,434 B1* | 3/2023 | Hornsby | H04L 63/101 |
| 2002/0188584 A1 | 12/2002 | Ghannam et al. | |
| 2007/0112652 A1 | 5/2007 | Ricketts | |
| 2007/0239700 A1 | 10/2007 | Ramachandran | |
| 2013/0013753 A1 | 1/2013 | Zessin et al. | |
| 2013/0179874 A1* | 7/2013 | Aliminati | H04L 63/0272 717/176 |
| 2013/0326038 A1* | 12/2013 | Bodik | G06F 9/4856 709/223 |
| 2014/0122666 A1* | 5/2014 | Malhotra | G06F 3/0482 709/220 |
| 2015/0220408 A1 | 8/2015 | Jaisinghani | |
| 2015/0381407 A1* | 12/2015 | Wang | H04L 41/0668 370/221 |
| 2016/0043919 A1* | 2/2016 | Connelly | H04L 41/28 709/220 |
| 2016/0110817 A1* | 4/2016 | Buccetti | G06Q 40/08 705/4 |
| 2016/0127453 A1* | 5/2016 | Dingsor | G06F 9/46 709/217 |
| 2016/0162339 A1* | 6/2016 | Ghosh | G06F 9/5083 718/105 |
| 2016/0173487 A1* | 6/2016 | Griffith | H04L 63/0823 713/156 |
| 2017/0046247 A1* | 2/2017 | Nutter | G06F 11/3684 |
| 2017/0068524 A1* | 3/2017 | Ghosh | G06F 8/63 |
| 2017/0116013 A1* | 4/2017 | Chen | G06F 11/14 |
| 2018/0063193 A1* | 3/2018 | Chandrashekhar | G06F 15/177 |
| 2018/0145871 A1* | 5/2018 | Golin | H04L 51/48 |
| 2018/0150520 A1* | 5/2018 | Koetter | G06F 16/27 |
| 2018/0174072 A1* | 6/2018 | Charles | G06N 3/044 |
| 2018/0246911 A1* | 8/2018 | Lee | G06F 16/21 |
| 2019/0102158 A1 | 4/2019 | Thanayankizil et al. | |
| 2019/0188022 A1* | 6/2019 | Jung | G06F 9/45558 |
| 2019/0205157 A1* | 7/2019 | Bianchini | G06F 9/5044 |
| 2019/0373007 A1* | 12/2019 | Salunke | G06F 11/3423 |
| 2020/0092334 A1* | 3/2020 | Hiebert | H04L 41/0816 |
| 2020/0117748 A1* | 4/2020 | Gupte | G06F 16/27 |
| 2020/0192772 A1* | 6/2020 | Asveren | G06F 11/2023 |
| 2020/0204620 A1* | 6/2020 | Troy | G06F 11/0793 |
| 2021/0117249 A1* | 4/2021 | Doshi | H04L 67/1001 |
| 2022/0021575 A1* | 1/2022 | Wang | G06N 20/00 |
| 2022/0029880 A1* | 1/2022 | Feiguine | H04L 63/08 |
| 2022/0327172 A1* | 10/2022 | Davies | G06F 16/24578 |
| 2022/0391294 A1* | 12/2022 | Kulkarni | G06F 9/54 |

OTHER PUBLICATIONS

SDLC—Quick Guide, downloaded Dec. 6, 2021 (27 pgs.). https://www.tutorialspoint.com/sdlc/sdlc_quick_guide.htm.
International Search Report and Written Opinion International Application No. PCT/US2023/011033 dated May 9, 2023, 8 pages.

* cited by examiner

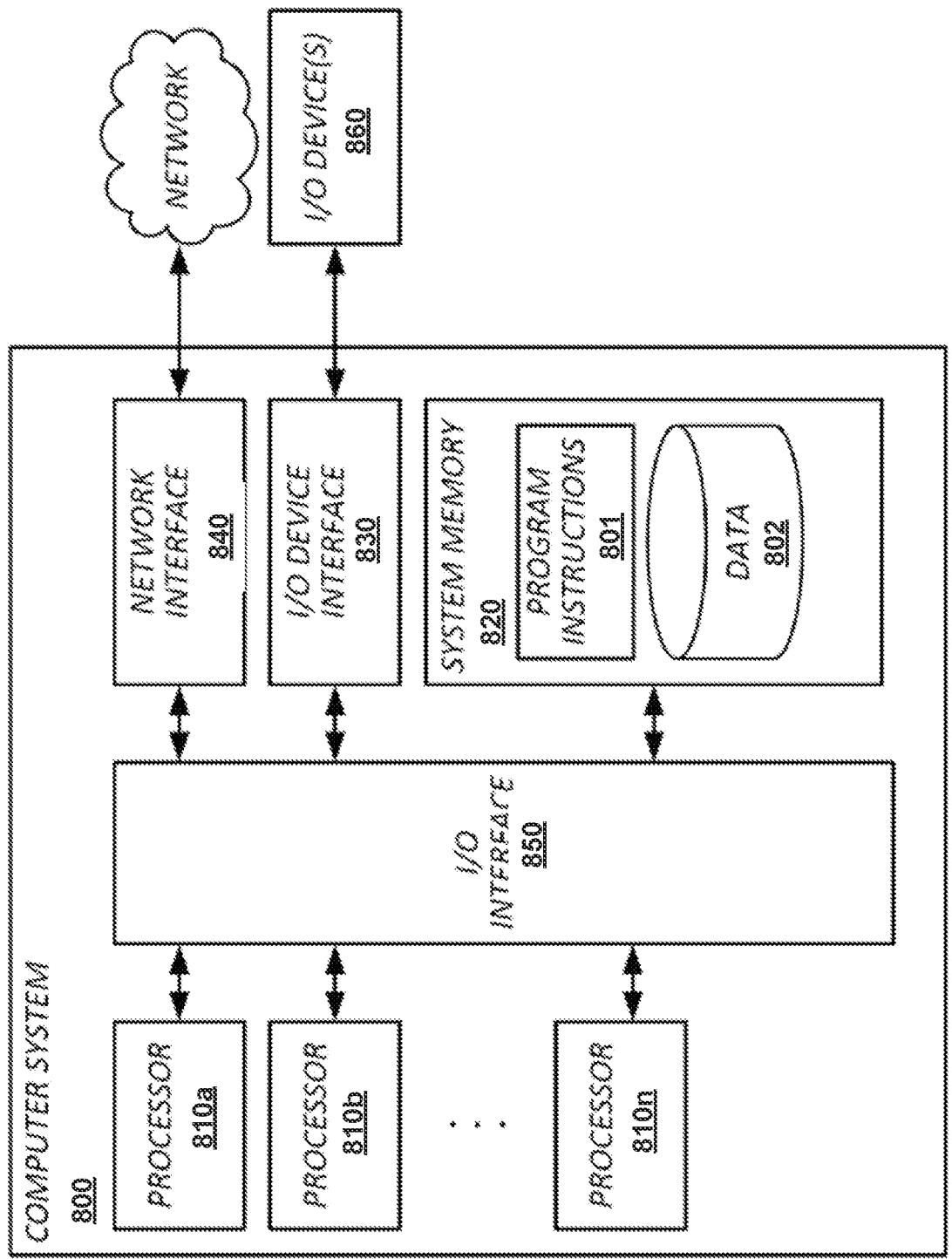

APPLICATION ARCHITECTURE DRIFT DETECTION SYSTEM

BACKGROUND

1. Field

The present disclosure relates generally to computing systems, and more particularly application architecture drift detection in computing systems.

2. Description of the Related Art

Computing devices, such as server computing devices, may host applications such as gaming applications, service applications, media applications, financial application, and/or any other application that are provided to a client device via a network. These applications may be built to utilize various architecture patterns to achieve different goals around application availability, resiliency, and cost. This architecture typically involves utilizing multiple server computing devices and/or datacenters when deploying an application to provide redundancy. A formal part of the design phase for an application project is to identify an architecture pattern that serves the needs of the application and its user-base. Given the number of changes throughout an application development lifecycle and over the life of an application, many factors can contribute to implementations that do not adhere to the agreed upon architecture pattern.

SUMMARY

The following is a non-exhaustive listing of some aspects of the present techniques. These and other aspects are described in the following disclosure.

Some aspects include a process including: obtaining, by a computing system via a network, a first set of architecture design metrics associated with a first application; obtaining, by the computing system via the network, a first set of data metrics associated with a first instance of the first application that is installed at a first server computing system; obtaining, by the computing system via the network, a second set of data metrics associated with a second instance of the first application that is installed at a second server computing system; determining, by the computing system and using the first set of data metrics and the second set of data metrics, that at least one of the first instance, the first server computing system, the second instance, or the second server computing system deviates from one or more architecture design metrics from the first set of architecture design metrics associated with the first application; and providing, by the computing system, a deviation notification indicating a deviation from the one or more architecture design metrics.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 8 is a schematic of a computing system, in accordance with some embodiments of the present disclosure.

Figure 1:
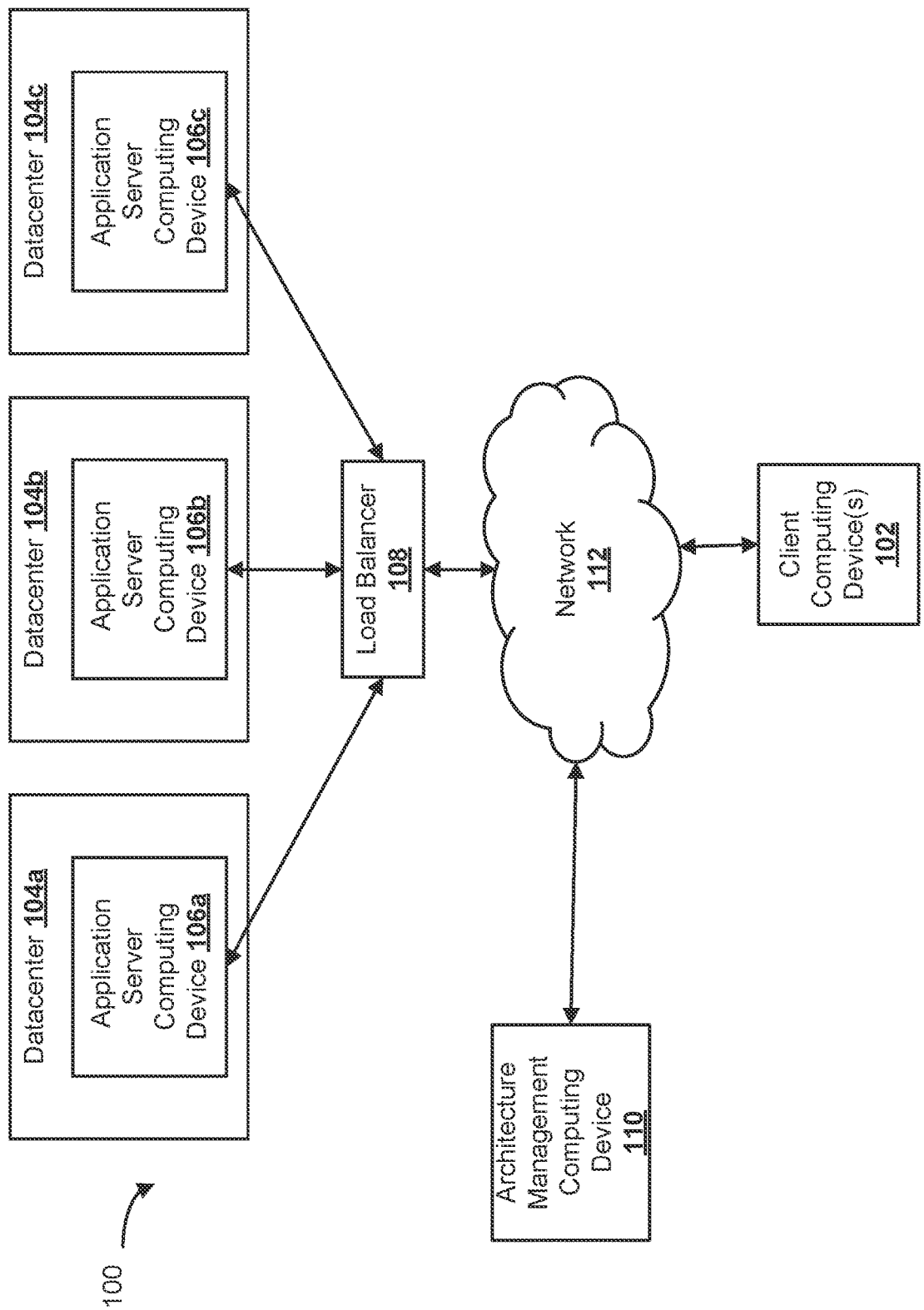
FIG. 1 is a schematic view illustrating an application architecture drift detection system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computing systems. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, a formal part of the design phase for an application project is to identify an architecture pattern that serves the needs of the application and its user-base. Given the number of changes throughout an application development lifecycle and over the life of an application, many factors can contribute to implementations that do not adhere to the agreed upon architecture pattern.

Many large organizations have a finite set of architecture pattern options for applications and there is a formalized process followed by application teams when designing applications. For example, in a three-datacenter scenario, designers can choose to have an application instance running actively, passively, or not at all in any of the three datacenters to achieve their application needs. When an application is not adhering to the architecture pattern chosen in the design phase, there is an associated risk which could have a technical, a financial, and/or a reputational impact. For example, the application may crash or may not have the proper redundancy if the architecture pattern chosen in the design phase is not implemented. As a result, the application may not be available to the end users, or the end users may have a less desirable experience when using the application. As such, it is contemplated by the present disclosure that a process needs to be in place to identify what architecture pattern was designed and validate if the application is currently implemented according to the chosen pattern. When an application's production implementation varies from the designed implementation, an architecture drift may be occurring.

Systems and method of the present disclosure provide for application architecture drift detection. In various embodiments and during an application development lifecycle, the architecture design metric is agreed, approved, and recorded. The architecture design metric may be any condition and/or configuration for which an application system is designed to include and operate. The architecture design metric may include an architecture status metric, an application version metric, and/or a resource configuration metric. At the end of the application development lifecycle, the application should be implemented in production according to the approved design pattern and architecture status metrics. In one of many possible ways for many reasons, the architecture design pattern is changed. For example, during the application development lifecycle, the application team changes the architecture pattern due to changes in requirements and the new design is not approved. In another example, during production implementation, the changes are made resulting in the production architecture pattern differing from the approved design. In yet another example, during use of the application, changes are made which result in the effective architecture pattern changing.

Embodiments of the present disclosure may provide an architecture drift detection controller that is running in real-time and determines that the application is running in production with an architecture pattern different from the approved architecture pattern. The architecture drift detection controller may make its determination by obtaining data metrics from an application monitoring application, a version monitoring application, and/or a resource monitoring application. Data metrics may include any data from an application system during its operations, many examples of which are described herein. When the actual architecture pattern is different from the approved architecture pattern, an administrator is notified of the difference or drift. In various embodiments, the administrator may make changes to the production implementation of the application to synchronize the application with the approved architecture pattern. However, in other embodiments, the administrator may update the approved architecture pattern to match that of the actual architecture pattern. By detecting a drift in the architecture pattern, an application version, and/or resource configuration of resources running the application, an administrator may correct the drift before an event occurs, which due to the drift, may cause the application to experience undesirable outcomes that would not have occurred if the production architecture pattern followed the approved architecture pattern. Thus, the systems and methods of the present disclosure reduce application downtime, reduce reputational risk, improve bandwidth for the application, improve user experiences for users that are using the application, and/or other technical benefits that would be apparent to one of skill in the art in possession of the present disclosure.

Referring now to FIG. 1, a block diagram of an application architecture drift detection system 100, consistent with various embodiments, is illustrated. In various embodiments, the application architecture drift detection system 100 may include a client computing device 102, one or more datacenters (e.g., a datacenter 104a, a datacenter 104b, and/or a datacenter 104c) that each include one or more application server computing devices (e.g., an application server computing device 106a, an application server computing device 106b, and/or an application server computing device 106c), and a load balancer 108, and an architecture management computing device 110. The client computing device 102, the application server computing devices 106a, 106b, and 106c, the load balancer 108, and the architecture management computing device 110 may be in communication with each other over a network 112. While illustrated as being provided between the network 112 and the application server computing devices 106a-106c, the server computing devices 106a-106c may be coupled to the load balancer 108 via the network 112.

In various embodiments, the client computing device 102 may be implemented using any appropriate combination of hardware and/or software configured for wired and/or wireless communication over the network 112. For example, the client computing device 102 may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HMD), a watch, an eyeglass projection screen, an autonomous/semi-autonomous device, a vehicle, an Unmanned Arial Vehicle (UAV), a robotic device, a user badge, and/or other client computing device that would be apparent to one of skill in the art in possession of the present disclosure. In various embodiments, the client computing device 102 may include any appropriate combination of hardware and/or software having one or more processors and capable of reading instructions stored on a tangible non-transitory machine-readable medium for execution by the one or more processors. Consistent with some embodiments, the client computing device 102 includes a machine-readable medium, such as a memory (not shown) that includes instructions for execution by one or more processors (not shown) for causing the client computing device 102 to perform specific tasks. In some embodiments, the instructions may be executed by the one or more processors in response to interaction by the user.

The client computing device 102 may include a communication system having one or more transceivers to enable the client computing device 102 to communicate with other client computing devices, the application server computing devices 106a-106c, and/or the architecture management computing device 110. Accordingly, and as disclosed in further detail below, the client computing device 102 may be in communication with systems directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the client computing device 102 in the application architecture drift detection system 100 of FIG. 1 may include first (e.g., relatively long-range) transceiver(s) to permit the client computing device to communicate with the network 112 via a communication channel. In various embodiments, the network 112 may be implemented as a single network or a combination of multiple networks. For example, in various embodiments, the network 112 may include the Internet and/or one or more intranets, landline networks, wireless networks, and/or other appropriate types of communication networks. In another example, the network 112 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth generation (5G) wireless network and/or any subsequent generations. However, in some examples, the network 112 may be additionally or alternatively be implemented by one or more other communication networks, such as, but not limited to, a satellite communication network, a microwave radio network, and/or other communication networks.

The client computing device 102 additionally may include second (e.g., short-range relative to the range of the first transceiver) transceiver(s) to permit the client computing device 102 to communicate with other client computing devices via a direct communication channel. Such second transceivers may be implemented by a type of transceiver supporting short-range (e.g., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (LR) transceiver, and other transceivers that are configured to allow the client computing device 102 to intercommunicate with other client computing devices via an ad-hoc or other wireless network.

The application architecture drift detection system 100 also includes or may be in communication with the application server computing devices 106a, 106b, and/or 106c. For example, the application server computing devices 106a-106c may include one or more server devices, storage systems, cloud computing systems, and/or other computing devices. In various embodiments, the application server computing devices 106a-106c may also include any appropriate combination of hardware and/or software having one or more processors and capable of reading instructions stored on a tangible non-transitory machine-readable medium for execution by the one or more processors. Consistent with some embodiments, the application server computing devices 106a-106c include a machine-readable medium, such as a memory (not shown) that includes instructions for execution by one or more processors (not shown) for causing the application server computing devices 106a-106c to perform specific tasks. In some embodiments, the instructions may be executed by the one or more processors in response to interaction by the user. The application server computing devices 106a-106c may also be maintained by an entity with which sensitive credentials and information may be exchanged with the client computing device 102. The application server computing devices 106a-106c may further be one or more servers that hosts one or more applications for the client computing device 102. In some embodiments, the server computing devices 106a-106c include a redundant application instance of one or more applications. The server computing devices 106a-106c may more generally include a web site, an online content manager, a service provider application, and/or other application that provides content and/or services to the user. The server computing devices 106a-106c may also be in communication with one or more external databases, that may provide additional information that may be used by the application server computing devices 106a-106c. In some embodiments, each application server computing device 106a, 106b, 106c is hosted in a respective datacenter 104a, 104b, and 104c. However, in other embodiments, the application server computing devices 106a-106c may be included in single datacenter or may be provided as virtual machines running on a single computing system.

The application architecture drift detection system 100 also includes or may be in communication with the load balancer 108. The load balancer 108 may include one or more front-end server computing devices running a load balancing application. For example, the load balancer 108 may include one or more server devices, storage systems, cloud computing systems, and/or other computing devices. In other examples, the load balancer 108 may include one or more networking devices such as a routing device, a switch device, and/or any other networking device that would be apparent to one of skill in the art in possession of the present disclosure that may be running a load balancing application. In yet other examples, the load balancer 108 may include specialized hardware and/or may include a one or more virtualized instances running on the specialized hardware that is configured to run a load balancing application. The load balancing application may provide one or more load balancing algorithms that disperse network traffic to the application server computing devices 106a-106c to ensure that no single server becomes overworked and unreliable, and thus minimizes response time and maximizes throughput. The load balancing algorithms may include a round robin algorithm, a least connection algorithm, a least response time algorithm, a least bandwidth algorithm, a hashing algorithm, a custom algorithm, and/or any other load balancing algorithm that would be apparent to one of skill in the art in possession of the present disclosure. While some examples of a load balancer 108 are disclosed, other load balancers may be contemplated and fall under the scope of the present disclosure as well.

The application architecture drift detection system 100 also includes or may be in communication with the architecture management computing device 110. For example, the architecture management computing device 110 may include one or more server devices, storage systems, cloud computing systems, and/or other computing devices (e.g., desktop computing device(s), laptop/notebook computing device(s), tablet computing device(s), mobile phone(s), etc. In various embodiments, the architecture management computing device 110 may also include any appropriate combination of hardware and/or software having one or more processors and capable of reading instructions stored on a tangible non-transitory machine-readable medium for execution by the one or more processors. Consistent with some embodiments, the architecture management computing device 110 includes a machine-readable medium, such as a memory (not shown) that includes instructions for execution by one or more processors (not shown) for causing the architecture management computing device 110 to perform specific tasks. In some embodiments, the instructions may be executed by the one or more processors in response to interaction by the user. The architecture management computing device 110 may include management applications used to manage the application architecture drift detection system 100 including functionality of detecting drift in architecture design metrics such as, for example, an architecture pattern of the application server computing devices 106a-106c (e.g., application instance status (e.g., passive or active)), an application version for each application instance running on the application server computing devices 106a-106c, and/or a resource configuration of the application server computing devices 106a-106c. While a specific application architecture drift detection system 100 is illustrated in FIG. 1, one of skill in the art in possession of the present disclosure will recognize that other components and configurations are possible, and thus will fall under the scope of the present disclosure.

Figure 2:
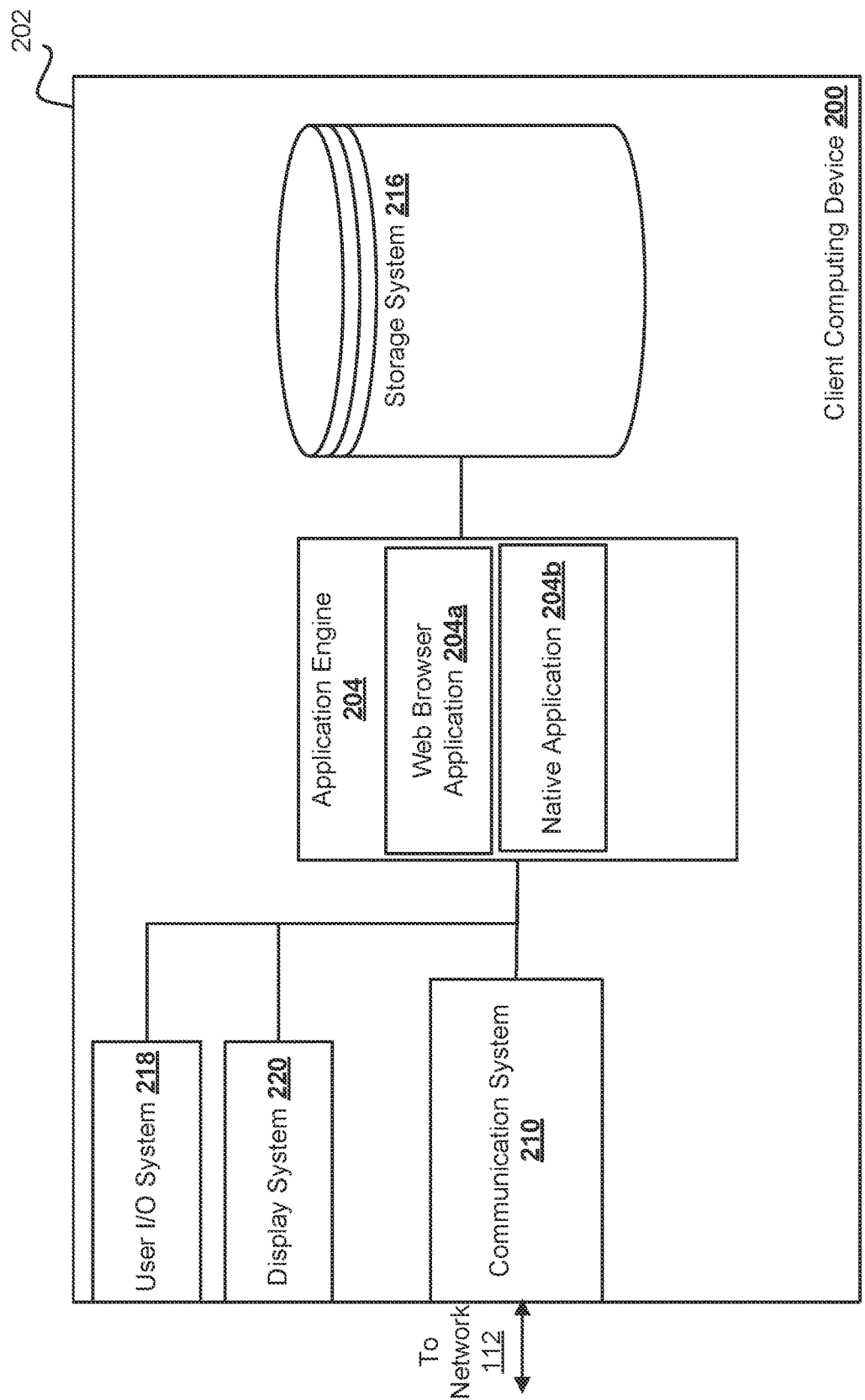
FIG. 2 is a schematic view illustrating a client computing device included in the application architecture drift detection system of FIG. 1, in accordance with some embodiments of the present disclosure.

Referring now to FIG. 2, an embodiment of a client computing device 200 is illustrated that may be the client computing device 102 discussed above with reference to FIG. 1. In the illustrated embodiment, the client computing device 200 includes a chassis 202 that houses the components of the client computing device 200. Several of these components are illustrated in FIG. 2. For example, the chassis 202 may house a processing system (not illustrated) and a non-transitory memory system (not illustrated) that includes instructions that, when executed by the processing system, cause the processing system to provide an application engine 204 that is configured to perform the functions of the application engine and/or the client computing devices discussed below. In the specific example illustrated in FIG. 2, the application engine 204 is configured to provide one or more of a web browser application 204a or a native application 204b.

The chassis 202 may further house a communication system 210 that is coupled to the application engine 204 (e.g., via a coupling between the communication system 210 and the processing system). The communication system 210 may include software or instructions that are stored on a computer-readable medium and that allow the client computing device 200 to send and receive information through the communication networks discussed above. For example, the communication system 210 may include a communication interface to provide for communications through the network 112 as detailed above (e.g., first (e.g., long-range) transceiver(s)). In an embodiment, the communication interface may include a wireless antenna that is configured to provide communications with IEEE 802.11 protocols (Wi-Fi), cellular communications, satellite communications, other microwave radio communications and/or communications. The communication system 210 may also include a communication interface (e.g., the second (e.g., short-range) transceiver(s)) that is configured to provide direct communication with other client computing devices, sensors, storage devices, beacons, and other devices included in the securitization system discussed above with respect to FIG. 1. For example, the communication interface may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and/or other wireless communication protocols that allow for direct communication between devices.

The chassis 202 may house a storage device (not illustrated) that provides a storage system 216 that is coupled to the application engine 204 through the processing system. The storage system 216 may be configured to store data, applications, and/or instructions described in further detail below and used to perform the functions described herein. In various embodiments, the chassis 202 also houses a user Input/Output (I/O) system 218 that is coupled to the application engine 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, and/or any other input subsystem. The chassis 202 also houses a display system 220 that is coupled to the application engine 204 (e.g., via a coupling between the processing system and the display system 220) and may be included in the user I/O system 218. In an embodiment, the display system 220 may be provided by a display device that is integrated into the client computing device 200 and that includes a display screen (e.g., a display screen on a laptop/notebook computing device, a tablet computing device, a mobile phone, or wearable device), or by a display device that is coupled directly to the client computing device 200 (e.g., a display device coupled to a desktop computing device by a cabled or wireless connection). However, while a client computing device 200 and several embodiments of its operation are illustrated and described herein, one of skill in the art in possession of the present disclosure will recognize that client computing devices may include a variety of components and component configuration and may operate in a variety of manners that will fall within the scope of the present disclosure as well.

Figure 3:
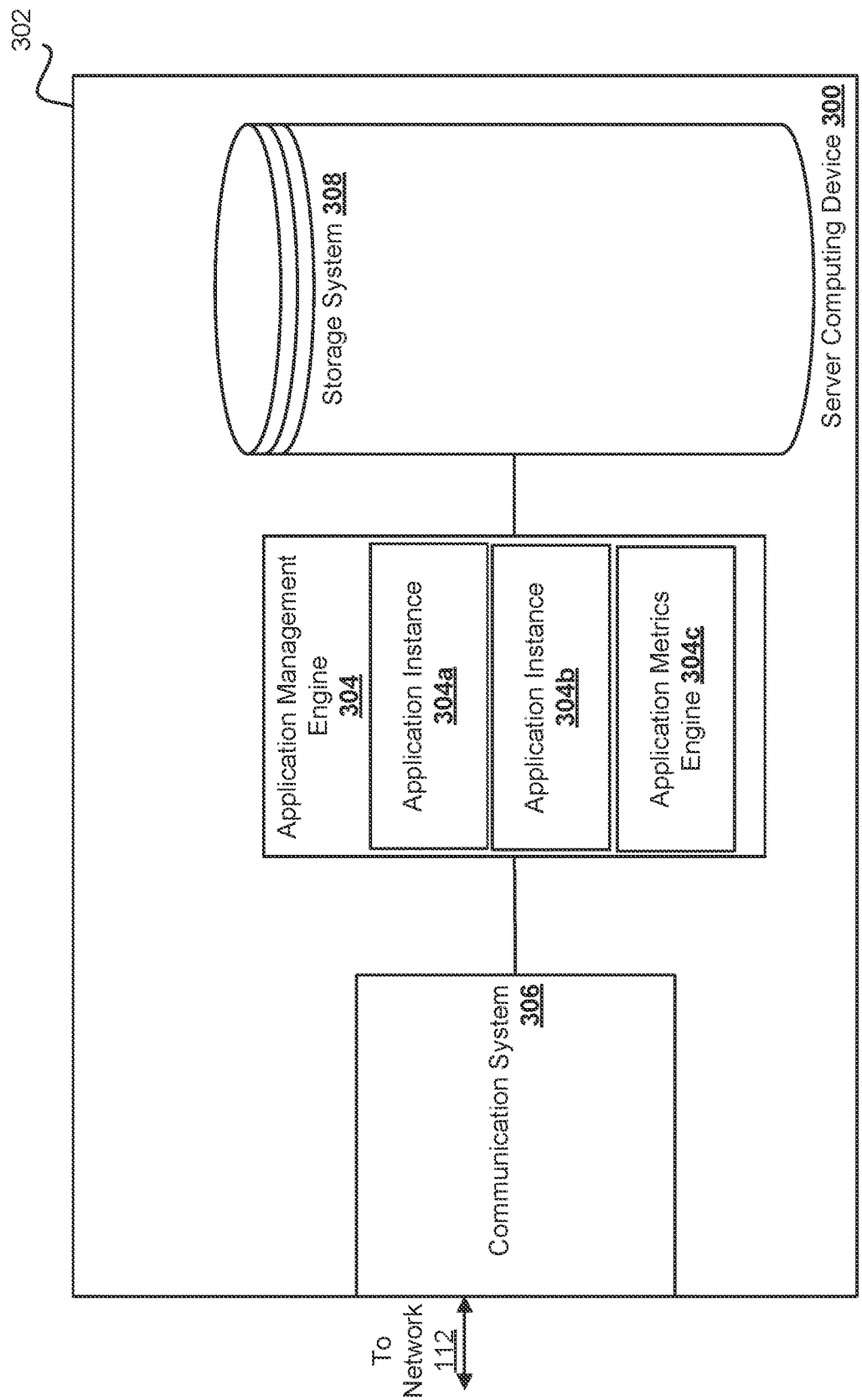
FIG. 3 is a schematic view illustrating an application server computing device included in the application architecture drift detection system of FIG. 1, in accordance with some embodiments of the present disclosure.

Referring now to FIG. 3, an embodiment of an application server computing device 300 is illustrated that may be any of application server computing devices 106a-106c discussed above with reference to FIG. 1. In the illustrated embodiment, the application server computing device 300 includes a chassis 302 that houses the components of the application server computing device 300, only some of which are illustrated in FIG. 3. For example, the chassis 302 may house a processing system (not illustrated) and a non-transitory memory system (not illustrated) that includes instructions that, when executed by the processing system, cause the processing system to provide an application management engine 304 that is configured to perform the functions of the application management engines and/or application server computing devices discussed below. The application management engine 304 may include one or more applications instances (e.g. an application instance 304a for a first application and an application instance 304b for a second application) that are hosted by application server computing device 300 and provided to the client computing device 102/200 of FIGS. 1 and 2 via the network 112 such that the client computing device 102/200 may access the application instances via the web browser application 204a or the native application 204b. In various embodiments, the application management engine 304 may include an application metric engine 304c that is configured to perform the functions of the application metric engines and/or application server computing devices discussed below such as, for example, monitoring the application instances, server computing device resources and/or components, and/or other architecture components and obtain data metrics for those architecture components.

The chassis 302 may further house a communication system 306 that is coupled to the application management engine 304 (e.g., via a coupling between the communication system 306 and the processing system) and that is configured to provide for communication through the network 112 of FIG. 1 as detailed below. The communication system 306 may allow the application server computing device 300 to send and receive information over the network 112 of FIG. 1. The chassis 302 may also house a storage device (not illustrated) that provides a storage system 308 that is coupled to the application management engine 304 through the processing system. The storage system 308 may be configured to store data and/or instructions to complete the functionality discussed herein. In various embodiments, the storage system 308 may be provided on the application server computing device 300 and/or on a database accessible via the communication system 306. However, while an application server computing device 300 and several embodiments of its operation are illustrated and described herein, one of skill in the art in possession of the present disclosure will recognize that application server computing devices may include a variety of components and component configuration and may operate in a variety of manners that will fall within the scope of the present disclosure as well.

Figure 4:
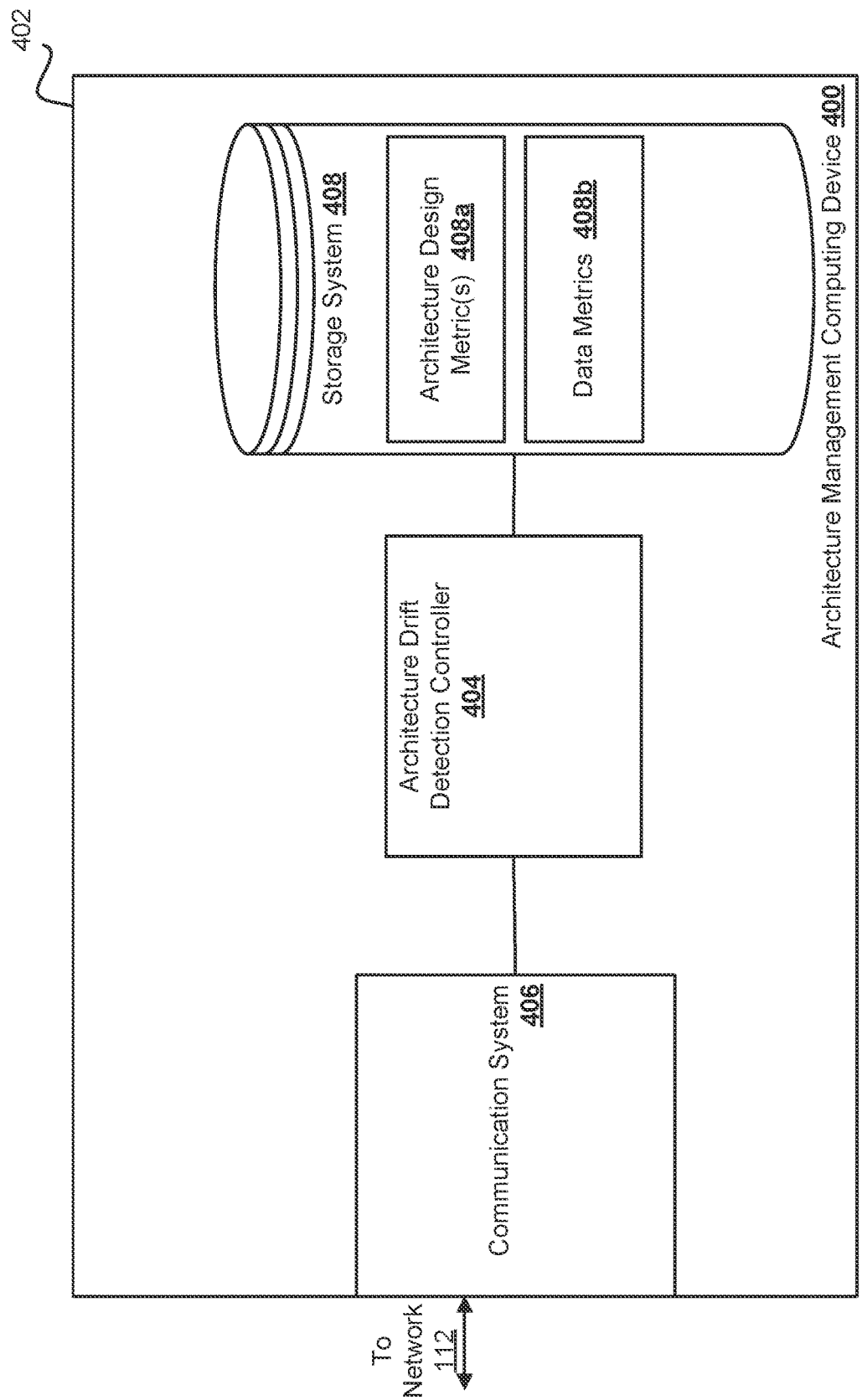
FIG. 4 is a schematic view illustrating an architecture management computing device included in the application architecture drift detection system of FIG. 1, in accordance with some embodiments of the present disclosure.

Referring now to FIG. 4, an embodiment of an architecture management computing device 400 is illustrated that may be an architecture management computing device 110 discussed above with reference to FIG. 1. In the illustrated embodiment, the architecture management computing device 400 includes a chassis 402 that houses the components of the architecture management computing device 400, only some of which are illustrated in FIG. 4. For example, the chassis 402 may house a processing system (not illustrated) and a non-transitory memory system (not illustrated) that includes instructions that, when executed by the processing system, cause the processing system to provide an architecture drift detection controller 404 that is configured to perform the functions of the architecture drift detection controller and/or architecture management computing device discussed below.

The chassis 402 may further house a communication system 406 that is coupled to the architecture drift detection controller 404 (e.g., via a coupling between the communication system 406 and the processing system) and that is configured to provide for communication through the network 112 of FIG. 1 as detailed below. The communication system 406 may allow the architecture management computing device 400 to send and receive information over the network 112 of FIG. 1. The chassis 402 may also house a storage device (not illustrated) that provides a storage system 408 that is coupled to the architecture drift detection controller 404 through the processing system. The storage system 408 may be configured to store data and/or instructions to complete the functionality discussed herein. For example, the storage system 408 may store architecture design metrics 408a and data metrics 408b that are received from the application server computing devices 106a-106c/300 of FIGS. 1 and 3 and/or the load balancer 108. In various embodiments, the storage system 408 may be provided on the architecture management computing device 400 and/or on a database accessible via the communication system 406. However, while an architecture management computing device 400 and several embodiments of its operation are illustrated and described herein, one of skill in the art in possession of the present disclosure will recognize that architecture management computing devices may include a variety of components and component configuration and may operate in a variety of manners that will fall within the scope of the present disclosure as well.

Figure 5:
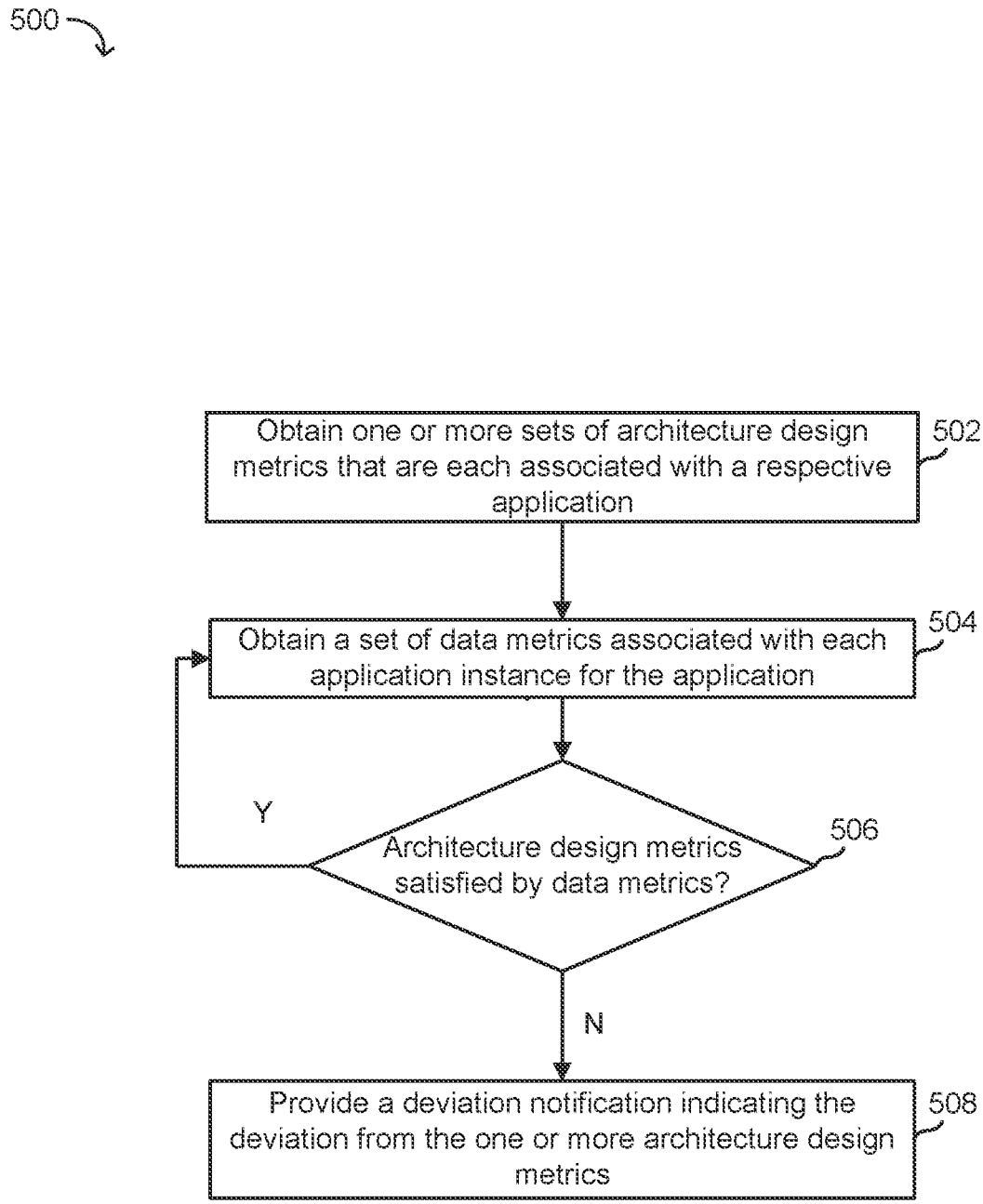
FIG. 5 is a flow chart illustrating a method, in accordance with some embodiments of the present disclosure.

Referring now to FIG. 5, a method 500 for providing application architecture drift detection is illustrated. The method 500 may begin at block 502 where one or more sets of architecture design metrics associated with one or more applications, respectively, are obtained. In an embodiment, at block 502 and with reference to FIGS. 1, 3 and 4, the architecture drift detection controller 404 of the architecture management computing device 110/400 may obtain an architecture design metric 408a for the first application that is associated with the application instance 304a. In various embodiments, the architecture drift detection controller 404 of the architecture management computing device 110/400 may obtain another architecture design metric 408a for a second application that is associated with the application instance 304b. For example, system administrator may generate and/or load the architecture design metrics 408a for a first application and/or a second application via a management terminal coupled with the architecture management computing device 110/400. In some embodiments, the management terminal may include the client computing device 102/200.

As discussed above, the architecture design metric 408a may include a desired architecture for a deployed application. In various embodiments, the architecture design metric 408a for the first application may include an architecture status metric, an application version metric, and/or a resource configuration metric. For example, the architecture status metric may include an application instance status pattern for application instances for an application. The application version metric may indicate an application version for an application. The resource configuration metric may include a resource configuration for an application server computing device 106a-106b/300 hosting the application or other components in the datacenters 104a-104c (e.g., networking resources, storage resources, and/or other resources that would be apparent to one of skill in the art in possession of the present disclosure). For example, the resource configuration may indicate the amount of processing resources, bandwidth, memory resources, storages resources, and/or or other resources required to host an application instance of an application that would be apparent to one of skill in the art in possession of the present disclosure.

Figure 6:
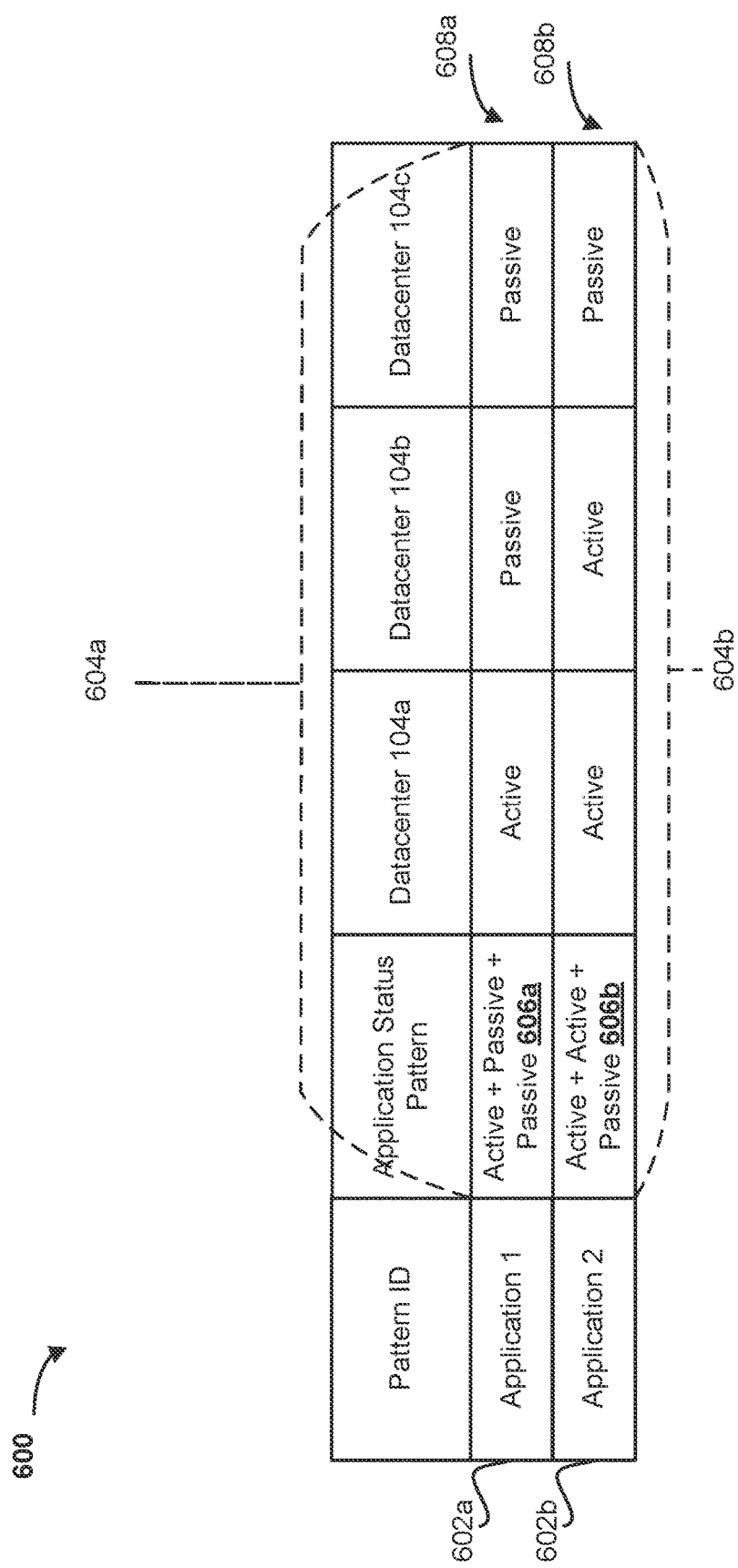
FIG. 6 is table illustrating an architecture design metric table used during the method of FIG. 5, in accordance with some embodiments of the present disclosure.

Referring now to FIG. 6 an example of an architecture design metric table 600 that includes an architecture design metric 602a for the application (e.g., "Application 1") associated with the application instance 304a for FIG. 3 and an architecture design metric 602b for the application (e.g., "Application 2") associated with the application instance 304b is illustrated. In the illustrated example, the architecture design metrics 602a and 602b include architecture status metrics 604a and 604b, respectively.

The architecture status metrics 604a may include an application instance status pattern 606a that identifies the desired status for a combination of the application instances 304a in the application server computing devices 106a, 106b, and 106c and/or datacenters 104a, 104b, and 104c. In the illustrated example, the application instance status pattern 606a indicates, for "Application 1" that is associated with the application instances 304a, one of the application server computing devices 106a-106c or one of the datacenters 104a-104c should have an active application instance status, and two of the application server computing devices 106a-106c or two of the datacenters 104a-104c should have a passive application instance status. In some embodiments, the architecture status metrics 604a may include a specific application instance status pattern 608a that identifies the desired status for each of the application instances 304a in the application server computing devices 106a, 106b, and 106c and/or datacenters 104a, 104b, and 104c. In the illustrated example, the specific application instance status pattern 608a indicates, for "Application 1" that is associated with the application instances 304a, the application server computing device 106a or the datacenter 104a should have an active application instance status and the application server computing devices 106b and 106c or the datacenters 104b and 104c should have a passive application instance status.

Similarly, the architecture status metrics 604b may include an application instance status pattern 606b that identifies the desired status for a combination of the application instances 304b in the application server computing devices 106a, 106b, and 106c and/or datacenters 104a, 104b, and 104c. The illustrated example further illustrates that the application instance status pattern 606b indicates, for "Application 2" that is associated with the application instances 304b, two of the application server computing devices 106a-106c or two of the datacenters 104a-104c should have an active application instance status, and one of the application server computing devices 106a-106c or one of the datacenters 104a-104c should have a passive application instance status. In some embodiments, the architecture status metrics 604b may include a specific application instance status pattern 608b that identifies the desired status for each of the application instances 304a in the application server computing devices 106a, 106b, and 106c and/or datacenters 104a, 104b, and 104c. In the illustrated example, the specific application instance status pattern 608b indicates, for "Application 2" that is associated with the application instances 304a, the application server computing devices 106a and 106b or the datacenters 104a and 104b should have an active application instance status, and the application server computing device 106c or the datacenter 104c should have a passive application instance status.

In various embodiments, an active application status may indicate an application instance is deployed and serving application requests. A passive application instance status may indicate an application instance is deployed but not serving application requests. Other application instance statuses may include a deployed application instance status that indicates that the application instance is deployed but not running, and/or a not deployed application instance status that indicates that the application instance is not deployed at an application server computing device or a datacenter. While several application instance statuses are described other application instance statuses may be contemplated by one of skill in the art in possession of the present disclosure and fall within the scope of the present disclosure.

Referring back to FIG. 5, the method 500 may proceed to block 504 where a set of data metrics associated with each application instance for an application is obtained. In an embodiment, at block 504, the architecture drift detection controller 404 included on the management computing device 400 may obtain, via the network 112, a set of data metrics from the application server computing device 106a for the application instance 304a, a set of data metrics from the application server computing device 106b for the application instance 304a, a set of data metrics from the application server computing device 106c for the application instance 304a, a set of data metrics from the application server computing device 106a for the application instance 304b, a set of data metrics from the application server computing device 106b for the application instance 304b, and/or a set of data metrics from the application server computing device 106c for the application instance 304b.

In various embodiments, the application metric engine 304c may generate or detect the various data metrics. The data metrics may include application instance identifiers, application server computing device identifiers, and/or datacenter identifiers. For example, application licensing number, serial numbers, Media Access Control (MAC) addresses, and/or any other identifier may be included in the data metrics used to identify the application instance, the application server computing device running the application instance, or the datacenter in which the application server computing device is housed. Furthermore, the data metrics may include a deployment status, a number of calls for a given time period, business metrics (e.g., transactions volume, messages/sec, and the like), performance metrics (e.g., bandwidth, time to complete an application call), an application version, a resource configuration of hardware resources included on the application server computing devices 106a-106c and/or the datacenters 104a-104c, resource usage data, and/or any other data metric that would be apparent to one of skill in the art in possession of the present disclosure. As such, the application metric engine 304c may include any resource monitoring application and/or application monitoring application that would be apparent to one of skill in the art in possession of the present disclosure. For example, the application metric engine 304c may include AppDynamics provided by CISCO® headquartered in San Jose, Calif., United States. In other examples, the application metric engine 304 may include Prometheus, Cloudprober, and/or Foglight provided by QUEST® headquartered in Aliso Viejo, Calif., United States.

In other embodiments, the architecture drift detection controller 404 may obtain, via the network 112, a set of data metrics for any of the application server computing devices 106a-106c for any of the application instances 304a and/or 304b from the load balancer 108 that may include an application metric engine that may be similar to the application metric engine 304c of the application server computing devices 106a-106c. The data metrics, when obtained by the architecture drift detection controller 404, may be stored in the storage system 408 as data metrics 408b.

The method 500 may then proceed to decision block 506 where it is determined whether the sets of data metrics satisfy or deviate from one or more architecture design metrics included in the set of architecture design metrics. In an embodiment, at decision block 506, the architecture drift detection controller 404 included on the architecture management computing device 110/400 may compare the data metrics 408b to the architecture design metrics 408a and/or make determinations from the data metrics 408b that are then compared to the architecture design metrics 408a. For example, the data metrics that include an application version may be compared to an application version included in the architecture design metrics. In other examples, the data metrics that include resource usage (e.g., number of CPUs used by an application instance) be compared to a resource usage included in the architecture design metrics. In another example, the data metrics 408b may include a deployment metric for an application instance included on each of the application server computing devices 106a-106c that indicates whether an application instance is deployed or not at an application server computing device. The deployment metric, in combination with other data metrics, may be used in determining whether an application instance includes an active status, a passive status, a deployed status, or a not deployed status. Also, an application call metric included in the data metrics 408b may indicate whether an application is serving requests or not serving requests. The application call metric in combination with the deployment metric may be used in determining whether an application instance includes the active status, the passive status, the deployed status, or the not deployed status. As such, a determination from both the deployment metric and the application call metric may be used to determine an application instance status. The architecture drift detection controller 404 may then use that application instance status derived from the data metrics 408b to compare to the architecture design metrics 408a to determine whether the data metrics satisfy or deviate from one or more architecture design metrics. As such, the architecture drift detection controller 404 included on the architecture management computing device 110/400 may determine whether any of the application instances 304a and/or 304b on the application server computing device 106a-106c and/or the application server computing devices 106a-106c themselves satisfy architecture design metrics or deviate from any of the architecture design metrics.

Figure 7:
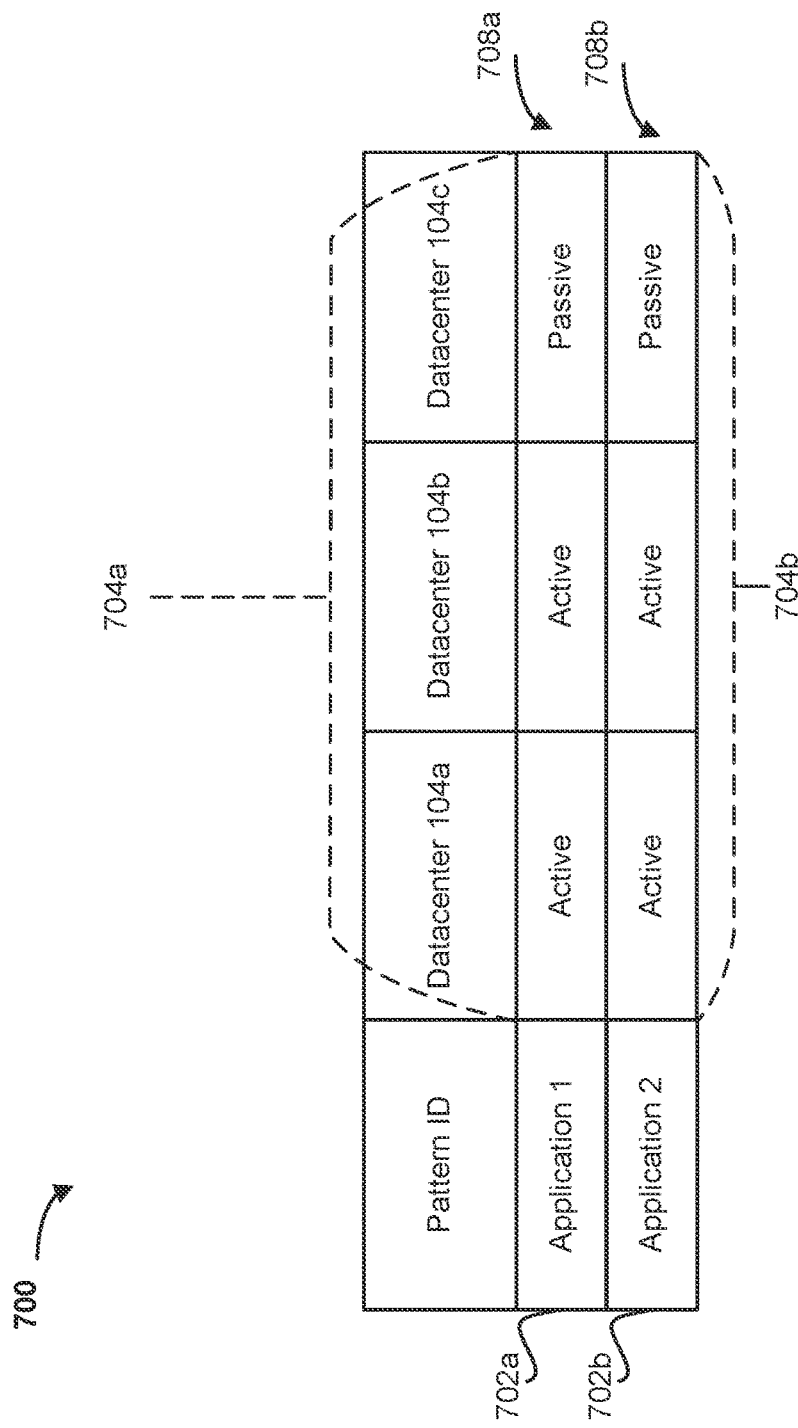
FIG. 7 is table illustrating a data metric table used during the method of FIG. 5, in accordance with some embodiments of the present disclosure.

Referring now to FIG. 7 an example of a data metric table 700 that includes an actual data metric 702a for the application (e.g., "Application 1") associated with the application instance 304a for FIG. 3 and an actual data metric 702b for the application (e.g., "Application 2") associated with the application instance 304b is illustrated. The data metric table 700 may be created using the data metrics received for "Application 1" and "Application 2." In the illustrated example, the actual data metrics 702a and 702b include actual architecture status metrics 704a and 704b, respectively.

The architecture status metrics 704a may include a specific application instance status pattern 708a that identifies the actual status for each of the application instances 304a in the application server computing devices 106a, 106b, and 106c and/or the datacenters 104a, 104b, and 104c. In the illustrated example, the actual application instance status pattern 708a indicates, for "Application 1" that is associated with the application instances 304a, the application server computing device 106a or the datacenter 104a has an active application instance status, the application server computing device 106b or the datacenter 104b has an active application instance status, and the application server computing device 106c or the datacenters 104c has a passive application instance status.

Similarly, the architecture status metrics 704b may include a specific application instance status pattern 708b that identifies the actual status for each of the application instances 304b in the application server computing devices 106a, 106b, and 106c and/or datacenters 104a, 104b, and 104c. In the illustrated example, the actual application instance status pattern 708b indicates, for "Application 2" that is associated with the application instances 304b, the application server computing device 106a or the datacenter 104a has an active application instance status, the application server computing device 106b or the datacenter 104b has an active application instance status, and the application server computing device 106c or the datacenters 104c has a passive application instance status.

As such, in the illustrated example in FIG. 7, the architecture drift detection controller 404 may determine by comparing the data metric table 700 to the architecture design metric table 600 of FIG. 6 that the "Application 1" deviates from the application instance status pattern 606a (e.g., 1 active and 2 passive) and/or the specific application instance status pattern 608a (e.g., datacenter 104a is "active," datacenter 104b is "passive," and datacenter 104c is "passive."). Similarly, the architecture drift detection controller 404 may determine by comparing the data metric table 700 to the architecture design metric table 600 that the "Application 2" satisfies the application instance status pattern 606b (e.g., 2 active and 1 passive) and/or the specific application status pattern 708b.

In some embodiments at decision block 506, whether the data metrics deviates from the architecture design metrics may include a single architecture design metric deviating from a proposed design metric. However, in other embodiments, a threshold number of architecture design metrics may be required before the deviation determination is made. In yet other embodiments, the deviation determination may be made based on a weight given to various architecture design metrics such that when a combined weight of deviations exceeds a weight threshold, the deviation classification may be justified. In various embodiments, the design metrics 408b may be received at various intervals (e.g., once per day, once per hour, once per 5 minutes, once per minute, or any other interval). As such the determination made at block 506 may occur at the same or different intervals.

If at decision block 506 it is determined that the data metrics satisfy the architecture design metrics, the method 500 may return back to block 504 where additional data metrics are obtained. However, in some embodiments, the architecture drift detection controller 404 included on the architecture management computing device 110/400 may generate and provide a compliance notification to a system administrator indicating the satisfaction of the one or more architecture design metrics by the data metrics. For example, an indicator light included at the management 110/400 may be activated, a E-mail may be sent to the system administrator's email address indicating the satisfaction, a Graphical User Interface (GUI) may be presented on a display screen of a terminal device coupled to the architecture management computing device 110/400, a log file may be generated and stored in the storage system 408, an audio indication may be outputted via an audio system coupled to the architecture management computing device 110/400, a data object may be updated, and/or any other compliance notification may be provided as would be apparent to one of skill in the art of the present disclosure.

If at decision block 506 it is determined that the data metrics deviate or in other words do not satisfy the architecture design metrics, the method 500 may proceed to block 508 where a deviation notification indicating the deviation from the one or more architecture design metrics is provided. In various embodiments, the architecture drift detection controller 404 included on the architecture management computing device 110/400 may generate and provide a deviation notification to a system administrator indicating the satisfaction of the one or more architecture design metrics by the data metrics. For example, an indicator light included at the management 110/400 may be activated that indicates a deviation, an E-mail may be sent to the system administrator's email address indicating the deviation, a Graphical User Interface (GUI) may be presented on a display screen of a terminal device coupled to the architecture management computing device 110/400 that displays a deviation warning, a log file or other data object may be generated and stored in the storage system 408 that indicates the deviation, an audio indication may be outputted via an audio system that indicates the deviation, and/or any other deviation notification may be provided that would be apparent to one of skill in the art of the present disclosure.

With knowledge of the deviation between the architecture design metrics 408a and the data metrics 408b, the administrator may update one or more of the application instances 304a or 304b, the application server computing devices 106a-106c, and/or any other hardware or software components at the datacenters 104a-104c to correct the architecture pattern drift, the version drift, and/or the resources configuration drift. However, in other embodiments, the administrator may determine that the detected drift is acceptable, and the administrator may update the architecture design metrics 408a such that the architecture design metrics 408a match metrics what is deployed on the application server computing device 106a-106c.

FIG. 8 is a diagram that illustrates an exemplary computing system 800 in accordance with embodiments of the present technique. Various portions of systems and methods described herein, may include or be executed on one or more computing systems similar to computing system 800. Further, processes and modules described herein may be executed by one or more processing systems similar to that of computing system 800. In various embodiments, the client computing device 102/200, the application server computing devices 106a-106c/300, the load balancer 108, and/or the architecture computing device 110/400 may be provided by the computing system 800.

Computing system 800 may include one or more processors (e.g., processors 810a-1010n) coupled to system memory 820, an input/output I/O device interface 830, and a network interface 840 via an input/output (I/O) interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a uni-processor system including one processor (e.g., processor 810a), or a multi-processor system including any number of suitable processors (e.g., 810a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 800 may include a plurality of computing devices (e.g., distributed computing systems) to implement various processing functions.

I/O device interface 830 may provide an interface for connection of one or more I/O devices 860 to computing system 800. I/O devices may include devices that receive input (e.g., from a user) or output information (e.g., to a user). I/O devices 860 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computing system 800 through a wired or wireless connection. I/O devices 860 may be connected to computing system 800 from a remote location. I/O devices 860 located on remote computing system, for example, may be connected to computing system 800 via a network and network interface 840.

Network interface 840 may include a network adapter that provides for connection of computing system 800 to a network. Network interface 840 may facilitate data exchange between computing system 800 and other devices connected to the network. Network interface 840 may support wired or wireless communication. The network may include an electronic communication network, such as the Internet, a local area network (LAN), a wide area network (WAN), a cellular communications network, or the like.

System memory 820 may be configured to store program instructions 801 or data 802. Program instructions 801 may be executable by a processor (e.g., one or more of processors 810a-810n) to implement one or more embodiments of the present techniques. Instructions 801 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 820 may include a non-transitory computer readable storage medium that may have program instructions stored thereon that are executable by a computer processor (e.g., one or more of processors 810a-810n) to cause the subject matter and the functional operations described herein. A memory (e.g., system memory 820) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 850 may be configured to coordinate I/O traffic between processors 810a-810n, system memory 820, network interface 840, I/O devices 860, and/or other peripheral devices. I/O interface 850 may perform protocol, timing, or other data transformations to convert data signals from one component (e.g., system memory 820) into a format suitable for use by another component (e.g., processors 810a-810n). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 800 or multiple computing systems 800 configured to host different portions or instances of embodiments. Multiple computing systems 800 may provide for parallel or sequential processing/execution of one or more portions of the techniques described herein.

Those skilled in the art will appreciate that computing system 800 is merely illustrative and is not intended to limit the scope of the techniques described herein. Computing system 800 may include any combination of devices or software that may perform or otherwise provide for the performance of the techniques described herein. For example, computing system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 800 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 800 may be transmitted to computing system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: obtaining, by a computing system via a network, a first set of architecture design metrics associated with a first application; obtaining, by the computing system via the network, a first set of data metrics associated with a first instance of the first application that is installed at a first server computing system; obtaining, by the computing system via the network, a second set of data metrics associated with a second instance of the first application that is installed at a second server computing system; determining, by the computing system and using the first set of data metrics and the second set of data metrics, that at least one of the first instance, the first server computing system, the second instance, or the second server computing system deviates from one or more architecture design metrics from the first set of architecture design metrics associated with the first application; and providing, by the computing system, a deviation notification indicating a deviation from the one or more architecture design metrics.

2. The non-transitory, machine-readable medium of claim 1, wherein the first server computing system is provided at a first datacenter, and the second server computing system is provided at a second datacenter.

3. The non-transitory, machine-readable medium of claim 1, wherein the operations further comprise: obtaining, by the computing system via the network, a second set of architecture design metrics associated with a second application; obtaining, by the computing system via the network, a third set of data metrics associated with a first instance of the second application that is installed at a third server computing system; obtaining, by the computing system via the network, a fourth set of data metrics associated with a second instance of the second application that is installed at a fourth server computing system; determining, by the computing system and using the third set of data metrics and the fourth set of data metrics, that at least one of the first instance of the second application, the third server computing system, the second instance of the second application, or the fourth server computing system satisfies the second set of architecture design metrics associated with the second application; and providing, by the computing system, a compliance notification indicating a satisfaction of the second set of architecture design metrics.

4. The non-transitory, machine-readable medium of claim 1, wherein the first set of architecture design metrics include at least one of an architecture status metric, an application version metric, or a resource configuration metric.

5. The non-transitory, machine-readable medium of claim 1, wherein the first set of architecture design metrics includes at least one architecture status metric indicating an active-passive status for the first instance of the first application and the second instance of the first application, and wherein the first set of data metrics and the second set of data metrics indicates an active-active status or a passive-passive status for the first instance of the first application and the second instance of the first application.

6. The non-transitory, machine-readable medium of claim 1, wherein the first set of architecture design metrics includes an application version metric indicating a first application version for the first application, and wherein the first set of data metrics and the second set of data metrics indicates that at least one of the first instance or the second instance includes a second application version for the first application that is different than the first application version.

7. The non-transitory, machine-readable medium of claim 1, wherein the first set of architecture design metrics includes a resource configuration metric indicating a first resource configuration for a server computing device, and wherein at least one of the first set of data metrics or the second set of data metrics indicates that at least one of the first server computing system or the second server computing system includes a second resource configuration that is different than the first resource configuration.

8. A tangible, non-transitory, machine-readable medium storing instructions that when executed by a data processing apparatus cause the data processing apparatus to perform operations comprising: the operations of any one of embodiments 1-7.

9. A system, comprising: one or more processors; and memory storing instructions that when executed by the processors cause the processors to effectuate operations comprising: the operations of any one of embodiments 1-7.

What is claimed is:

1. A non-transitory, machine-readable medium storing instructions that, when executed by one or more processors, effectuate operations comprising:
   obtaining, by a computing system via a network, an application instance pattern that indicates a first architecture status metric associated with a first instance of a first application and a second architecture status metric associated with a second instance of the first application, wherein the application instance pattern is defined prior to the first instance and the second instance of the first application being deployed;
   obtaining, by the computing system via the network, a first set of data metrics associated with the first instance of the first application that is installed at a first server computing system;
   obtaining, by the computing system via the network, a second set of data metrics associated with the second instance of the first application that is installed at a second server computing system;
   determining, by the computing system and using the first set of data metrics and the second set of data metrics, that at least one of the first instance, the first server computing system, the second instance, or the second server computing system deviates from the application instance pattern, including determining that the first set of data metrics deviates from the first architecture status metric or determining that the second set of data metrics deviates from the second architecture status metric; and
   providing, by the computing system, a deviation notification indicating a deviation from the application instance pattern.

2. The non-transitory, machine-readable medium of claim 1, wherein the first server computing system is provided at a first datacenter, and the second server computing system is provided at a second datacenter.

3. The non-transitory, machine-readable medium of claim 1, wherein the operations further comprise:
   obtaining, by the computing system via the network, a second application instance pattern that indicates a third architecture status metric associated with a first instance of a second application and a fourth architecture status metric associated with a second instance of the second application;
   obtaining, by the computing system via the network, a third set of data metrics associated with the first instance of the second application that is installed at a third server computing system;
   obtaining, by the computing system via the network, a fourth set of data metrics associated with the second instance of the second application that is installed at a fourth server computing system;
   determining, by the computing system and using the third set of data metrics and the fourth set of data metrics, that at least one of the first instance of the second application, the third server computing system, the second instance of the second application, or the fourth server computing system satisfies the second application instance pattern, including determining that the third set of data metrics satisfies the third architecture status metric or determining that the second set of data metrics satisfies from the fourth architecture status metric; and providing, by the computing system, a compliance notification indicating a satisfaction of the second application instance pattern.

4. The non-transitory, machine-readable medium of claim 1, wherein the application instance pattern comprises an application version metric or a resource configuration metric.

5. The non-transitory, machine-readable medium of claim 1, wherein the application instance pattern includes an application version metric indicating a first application version for the first application, and wherein the first set of data metrics and the second set of data metrics indicates that at least one of the first instance or the second instance includes a second application version for the first application that is different than the first application version.

6. The non-transitory, machine-readable medium of claim 1, wherein the application instance pattern includes a resource configuration metric indicating a first resource configuration for a server computing device, and wherein at least one of the first set of data metrics or the second set of data metrics indicates that at least one of the first server computing system or the second server computing system includes a second resource configuration that is different than the first resource configuration.

7. A method, comprising:
obtaining, by a computing system via a network, an application instance pattern that indicates a first architecture status metric associated with a first instance of a first application and a second architecture status metric associated with a second instance of the first application, wherein the application instance pattern is defined prior to the first instance and the second instance of the first application being deployed;
obtaining, by the computing system via the network, a first set of data metrics associated with the first instance of the first application that is installed at a first server computing system;
obtaining, by the computing system via the network, a second set of data metrics associated with the second instance of the first application that is installed at a second server computing system;
determining, by the computing system and using the first set of data metrics and the second set of data metrics, that at least one of the first instance, the first server computing system, the second instance, or the second server computing system deviates from the application instance pattern, including determining that the first set of data metrics deviates from the first architecture status metric or determining that the second set of data metrics deviates from the second architecture status metric; and
providing, by the computing system, a deviation notification indicating a deviation from the application instance pattern.

8. The method of claim 7, wherein the first server computing system is provided at a first datacenter, and the second server computing system is provided at a second datacenter.

9. The method of claim 7, further comprising:
obtaining, by the computing system via the network, a second application instance pattern that indicates a third architecture status metric associated with a first instance of a second application and a fourth architecture status metric associated with a second instance of the second application;
obtaining, by the computing system via the network, a third set of data metrics associated with the first instance of the second application that is installed at a third server computing system;
obtaining, by the computing system via the network, a fourth set of data metrics associated with the second instance of the second application that is installed at a fourth server computing system;
determining, by the computing system and using the third set of data metrics and the fourth set of data metrics, that at least one of the first instance of the second application, the third server computing system, the second instance of the second application, or the fourth server computing system satisfies the second application instance pattern, including determining that the third set of data metrics satisfies the third architecture status metric or determining that the second set of data metrics satisfies from the fourth architecture status metric; and
providing, by the computing system, a compliance notification indicating a satisfaction of the second application instance pattern.

10. The method of claim 7, wherein the application instance pattern comprises an application version metric or a resource configuration metric.

11. The method of claim 7, wherein the application instance pattern includes an application version metric indicating a first application version for the first application, and wherein the first set of data metrics and the second set of data metrics indicates that at least one of the first instance or the second instance includes a second application version for the first application that is different than the first application version.

12. The method of claim 7, wherein the application instance pattern includes a resource configuration metric indicating a first resource configuration for a server computing device, and wherein at least one of the first set of data metrics or the second set of data metrics indicates that at least one of the first server computing system or the second server computing system includes a second resource configuration that is different than the first resource configuration.

13. A system, comprising: one or more processors; and
memory storing instructions that when executed by the one or more processors cause the one or more processors to effectuate operations comprising:
obtaining, by a computing system via a network, an application instance pattern that indicates a first architecture status metric associated with a first instance of a first application and a second architecture status metric associated with a second instance of the first application, wherein the application instance pattern is defined prior to the first instance and the second instance of the first application being deployed;
obtaining, by the computing system via the network, a first set of data metrics associated with the first instance of the first application that is installed at a first server computing system;
obtaining, by the computing system via the network, a second set of data metrics associated with the second instance of the first application that is installed at a second server computing system;
determining, by the computing system and using the first set of data metrics and the second set of data metrics, that at least one of the first instance, the first server computing system, the second instance, or the second server computing system deviates from the application instance pattern, including determining that the first set of data metrics deviates from the first architecture status metric or determining that the second set of data metrics deviates from the second architecture status metric; and providing, by the computing system, a deviation notification indicating a deviation from the application instance pattern.

14. The system of claim 13, wherein the operations further comprise:

obtaining, by the computing system via the network, a second application instance pattern that indicates a third architecture status metric associated with a first instance of a second application and a fourth architecture status metric associated with a second instance of the second application;

obtaining, by the computing system via the network, a third set of data metrics associated with the first instance of the second application that is installed at a third server computing system;

obtaining, by the computing system via the network, a fourth set of data metrics associated with the second instance of the second application that is installed at a fourth server computing system;

determining, by the computing system and using the third set of data metrics and the fourth set of data metrics, that at least one of the first instance of the second application, the third server computing system, the second instance of the second application, or the fourth server computing system satisfies the second application instance pattern, including determining that the third set of data metrics satisfies the third architecture status metric or determining that the second set of data metrics satisfies from the fourth architecture status metric; and providing, by the computing system, a compliance notification indicating a satisfaction of the second application instance pattern.

15. The system of claim 13, wherein the application instance pattern comprises an application version metric or a resource configuration metric.

16. The system of claim 13, wherein the application instance pattern includes an application version metric indicating a first application version for the first application, and wherein the first set of data metrics and the second set of data metrics indicates that at least one of the first instance or the second instance includes a second application version for the first application that is different than the first application version.

17. The system of claim 13, wherein the application instance pattern includes a resource configuration metric indicating a first resource configuration for a server computing device, and wherein at least one of the first set of data metrics or the second set of data metrics indicates that at least one of the first server computing system or the second server computing system includes a second resource configuration that is different than the first resource configuration.

18. The non-transitory, machine-readable medium of claim 1, wherein the first set of data metrics includes data generated by a first server computing device during operation of the first instance of the first application, and the second set of data metrics includes data generated by a second server computing device during operation of the second instance of the first application.

19. The non-transitory, machine-readable medium of claim 1, wherein:

the first architecture status metric indicates whether the first instance of the first application should have a passive status, an active status, a deployed status, or a not deployed status; and the second architecture status metric indicates whether the second instance of the first application should have the passive status, the active status, the deployed status, or the not deployed status.

20. The non-transitory, machine-readable medium of claim 1, wherein the determination of the deviation from the application instance pattern is performed prior to an event occurring on at least one of the first instance, the first server computing system, the second instance, or the second server computing system, wherein the event causes the first application to experience a first outcome when the first set of data metrics deviates from the first architecture status metric or when the second set of data metrics deviates from the second architecture status metric, and the event causes the first application to experience a second outcome that is different than the first outcome when the first set of data metrics corresponds with the first architecture status metric and when the second set of data metrics corresponds with the second architecture status metric, and wherein the event is an occurrence on at least one of the first instance, the first server computing system, the second instance, or the second server computing system that results in the first architecture status metric of the first instance or the second architecture status metric of the second instance changing from an initial status.

* * * * *